US012764079B2

(12) United States Patent
Jin

(10) Patent No.: US 12,764,079 B2
(45) Date of Patent: Oct. 13, 2026

(54) SYSTEMS AND METHODS FOR GENERATING CONTEXTUAL REPLIES TO MEDIA CONTENT USING ARTIFICIAL INTELLIGENCE

(71) Applicant: Snap Inc., Santa Monica, CA (US)

(72) Inventor: Dennis Jin, Paris (FR)

(73) Assignee: Snap Inc., Santa Monica, CA (US)

(*) Notice: Subject to any disclaimer, the term of this patent is extended or adjusted under 35 U.S.C. 154(b) by 190 days.

(21) Appl. No.: 18/505,875

(22) Filed: Nov. 9, 2023

(65) Prior Publication Data

US 2025/0158940 A1 May 15, 2025

(51) Int. Cl.
*H04L 51/02* (2022.01)
*G06F 3/023* (2006.01)
(Continued)

(52) U.S. Cl.
CPC ............ *H04L 51/02* (2013.01); *G06F 3/0237* (2013.01); *G06F 16/90332* (2019.01);
(Continued)

(58) Field of Classification Search
CPC ......... H04L 51/02; H04L 51/52; H04L 51/10; G06F 40/166; G06F 3/0237; G06F 16/9032
See application file for complete search history.

(56) References Cited

U.S. PATENT DOCUMENTS

| | | | | |
|---|---|---|---|---|
| 10,303,756 B2 * | 5/2019 | Noshadi | ............... | G06V 40/161 |
| 11,062,084 B2 * | 7/2021 | Pasternack | ............ | G06F 40/247 |

(Continued)

FOREIGN PATENT DOCUMENTS

| | | |
|---|---|---|
| EP | 3815309 B1 | 8/2023 |
| WO | WO-2025101974 A1 | 5/2025 |

OTHER PUBLICATIONS

"International Application Serial No. PCT/US2024/055230, International Search Report mailed Jan. 24, 2025", 4 pgs.

(Continued)

*Primary Examiner* — Patrick F Riegler
(74) *Attorney, Agent, or Firm* — Schwegman Lundberg & Woessner, P.A.

(57) ABSTRACT

A system and method for generating contextually relevant reply suggestions for media posts is disclosed. The system analyzes media content to identify visual objects, scenes, text, and metadata attributes using computer vision techniques. Identified objects and attributes are incorporated into structured prompt templates to construct detailed natural language descriptions of the media context. The prompts are provided to a text generation artificial intelligence (AI) that outputs a plurality of contextual reply suggestions based on the media analysis. Suggestions are displayed as selectable options adjacent to the media post. Users can cycle through suggestions and select a reply to send. Selections are logged to improve the AI model. Feedback on suggestion quality can also be collected. By integrating computer vision and AI generation driven by engineered prompts, the system produces highly relevant, personalized responses tailored to media content. The techniques enhance user engagement with media posts through intelligent AI reply suggestions.

16 Claims, 9 Drawing Sheets

(51) Int. Cl.

| | |
|---|---|
| ***G06F 16/9032*** | (2019.01) |
| ***G06F 40/166*** | (2020.01) |
| ***H04L 51/10*** | (2022.01) |
| ***H04L 51/52*** | (2022.01) |

(52) U.S. Cl.

CPC ............ *G06F 40/166* (2020.01); *H04L 51/10* (2013.01); *H04L 51/52* (2022.05)

(56) References Cited

U.S. PATENT DOCUMENTS

| | | | | |
|---|---|---|---|---|
| 11,100,179 | B1 * | 8/2021 | Zhou | G10L 17/06 |
| 11,658,926 | B2 * | 5/2023 | Pasternack | G06F 16/951 709/206 |
| 11,962,546 | B1 * | 4/2024 | Hattangady | H04L 51/216 |
| 12,086,891 | B2 * | 9/2024 | Rakshit | G06Q 10/40 |
| 2017/0180276 | A1 * | 6/2017 | Gershony | H04L 51/222 |
| 2017/0180294 | A1 * | 6/2017 | Milligan | H04L 51/216 |
| 2018/0083901 | A1 | 3/2018 | Mcgregor, Jr. et al. | |
| 2018/0210874 | A1 * | 7/2018 | Fuxman | G06N 3/045 |
| 2018/0239770 | A1 * | 8/2018 | Ghotbi | G06F 15/76 |
| 2018/0295081 | A1 * | 10/2018 | McGregor, Jr. | H04L 51/02 |
| 2018/0324117 | A1 * | 11/2018 | Badr | H04L 51/10 |
| 2018/0359199 | A1 * | 12/2018 | Nguyen | G06N 20/00 |
| 2020/0004825 | A1 * | 1/2020 | Pasternack | G06F 40/35 |
| 2020/0106726 | A1 | 4/2020 | Pham | |
| 2020/0242296 | A1 * | 7/2020 | Shu | G06V 20/20 |
| 2022/0224659 | A1 * | 7/2022 | El Ghazzal | H04L 51/216 |
| 2024/0168605 | A1 * | 5/2024 | Zhang | G06V 20/41 |
| 2024/0370661 | A1 * | 11/2024 | Hirshberg | G06F 40/40 |

OTHER PUBLICATIONS

"International Application Serial No. PCT/US2024/055230, Written Opinion mailed Jan. 24, 2025", 4 pgs.

* cited by examiner

SYSTEMS AND METHODS FOR GENERATING CONTEXTUAL REPLIES TO MEDIA CONTENT USING ARTIFICIAL INTELLIGENCE

BACKGROUND

Social media and content sharing platforms allow users to share media content such as images, videos, and live streams. Shared media content often depicts events from a user's life or surroundings. Friends and connections on social platforms can view, interact with, and share comments on the media content.

Providing relevant and thoughtful comments requires the commenting user to comprehend the media item and author a meaningful reply. However, users may have difficulty quickly interpreting media content and articulating an engaging response. Composing comments is time-consuming and users can lack the context or creativity to provide compelling replies.

Artificial intelligence techniques exist to analyze information and simulate human conversation abilities. AI chatbots can be programmed with domain knowledge and logic to carry on intelligent dialogues. AI algorithms can also be trained on large datasets to generate human-like text outputs. Certain systems apply natural language processing to interpret images or videos based on recognized objects, backgrounds, and detected text.

While existing systems analyze media content and can simulate conversations, they lack capabilities to generate contextually relevant comments tailored to specific media posts. The present disclosure identifies and addresses shortcomings in the art regarding intelligent generation of contextual replies to shared media content.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
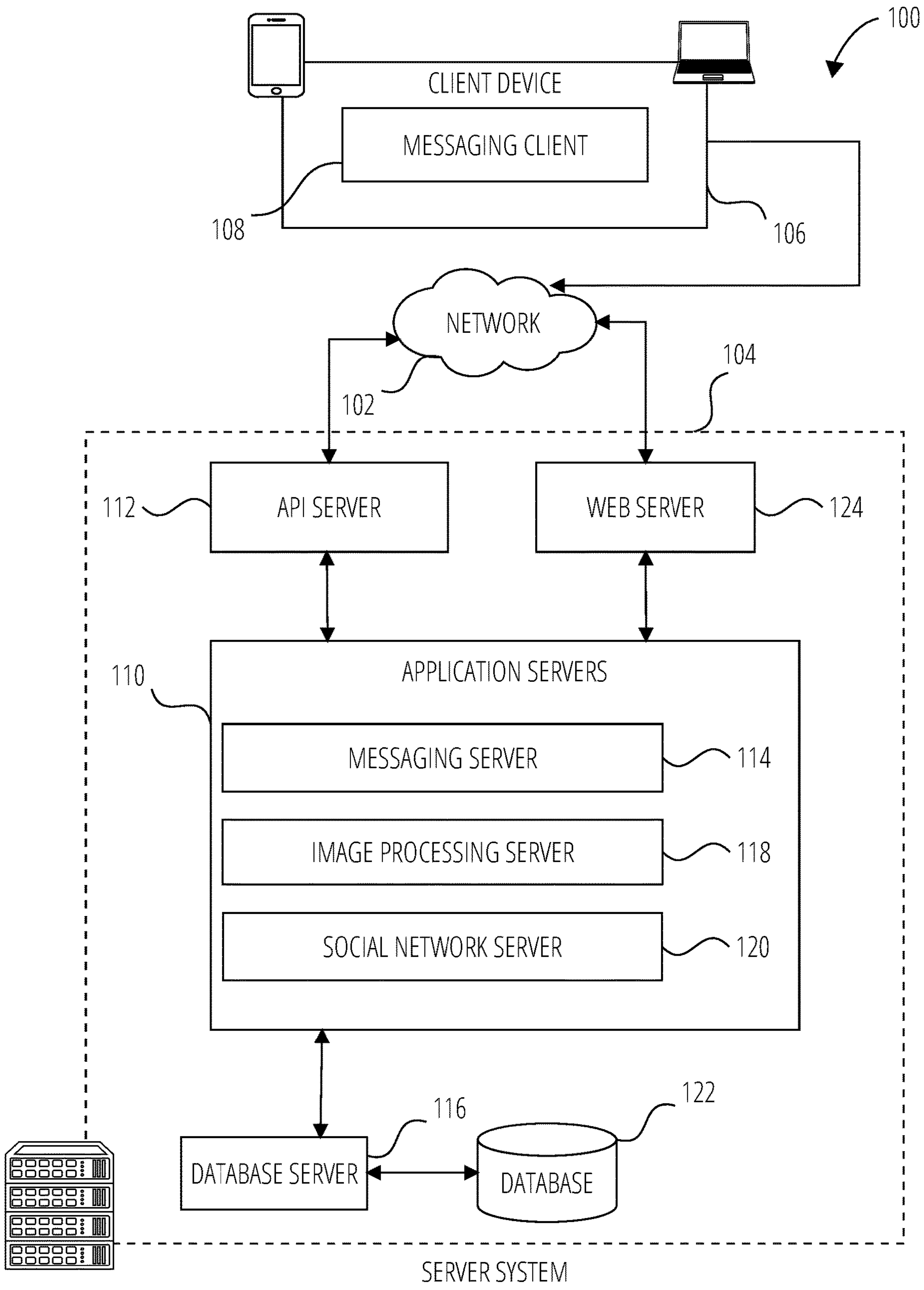
FIG. 1 is a diagrammatic representation of a networked environment in which the present disclosure may be deployed, in accordance with some examples.

Social media platforms have become a popular way for users to share experiences and events from their daily lives through photos, videos, and live broadcasts. Friends and connections can view the shared media content and interact through comments, reactions, and reshares. However, thoughtful commenting requires time and effort to comprehend the media item and author a meaningful reply. Users often lack the context or creativity to quickly provide compelling comments.

Existing systems apply artificial intelligence to interpret media content based on recognized objects, text, backgrounds, etc. Some systems can even simulate human conversation abilities. However, current technologies lack capabilities to generate contextually relevant comments tailored to specific media posts.

Accordingly, systems and methods are provided for context-based reply suggestions for media content. A presentation of media content is displayed at a client device, with the media content having associated media attributes. In response to a user request to reply to the media item, contextual information related to the client device is accessed. The system generates a plurality of reply suggestions based on the media attributes and contextual information. The AI-generated reply suggestions are displayed at the client device for the user to select and share as a comment.

In one aspect, the user request is generated when the user selects a graphical icon such as a "Magic Reply" button. The media content can include images, video, audio, and live broadcasts having recognizable objects, scenes, text, sounds, etc. that comprise the media attributes.

Contextual information is gathered such as the user's location, time of day, user profile data, and application usage history. The system identifies objects and context to generate a tailored prompt provided to an AI assistant. The AI assistant outputs multiple reply suggestions based on the prompt.

The AI-generated replies can populate a text field allowing the user to cycle through options. The user may edit a suggestion before sending. In some embodiments, the system trains the AI on the user's conversation history and style to output personalized, relevant suggestions.

In one implementation, generating the plurality of AI-powered reply suggestions involves constructing a prompt based on a predefined prompt template, the identified media attributes, and the gathered contextual information. For example, the system may maintain a set of prompt templates for different media types and contexts.

The prompt structure is combined with the actual media attributes, context, and user details to construct a customized prompt for the AI system. The completed prompt encapsulating the media specifics provides the AI with the information needed to output relevant replies. In one embodiment, the system selects from multiple prompt templates based on the media type, content attributes, and contextual information to create the most fitting prompt.

The constructed prompt is input to a generative AI system for generating the reply suggestions. The AI system may be implemented with natural language processing models trained on large datasets. In one embodiment, the system fine-tunes the AI models using actual user conversations and reply history to output suggestions in the user's personal style.

The AI system analyzes the detailed prompt and generates a set of suggested replies. The generated candidate replies are passed back and displayed to the user at the client device. The user can simply select their favorite option to share as a comment. In one embodiment, the generated reply suggestions are displayed within a text input field of the client device interface. This allows the user to easily select a suggestion to share as a comment.

For example, a first AI-generated reply suggestion is displayed in the text field. The user can then provide input such as tapping the suggestion to cycle through the plurality of suggestions. Based on this input attribute, the system displays a second different reply suggestion in the text field in place of the first suggestion. The user can thereby cycle through the full set of AI reply options by repeatedly tapping the suggestions displayed within the input field.

In one implementation, the media content comprises a depiction of one or more objects. For example, a photo may contain recognizable people, landmarks, products, text, and more. Responsive to receiving a request to generate a reply, the system analyzes the media using computer vision techniques to identify depicted objects based on the visual attributes.

Object recognition algorithms are applied to scan the media content and detect objects. The algorithms analyze shapes, textures, contexts, and visual features to identify objects and background scenes. For example, the system may perform object detection upon the media content (i.e., an image or video) using computer vision techniques. Convolutional neural networks analyze the pixel and frame content to identify visual objects. Pre-trained models detect common classes like people, faces, text, logos, animals, objects, scenes, etc. Custom object detectors can be developed to recognize domain-specific items.

In some embodiments, the system may extract additional attributes to characterize the objects, including: labels—classifying the general object type like "person" or "dog"; identifiers—unique IDs for tracking objects across media; locations—determining the object position and boundaries; sizes—measuring the object dimensions; relationships—identifying connections between objects; associated text—reading any text embedded in/near the object; and other metadata—colors, orientations, velocities, etc. The system may thereby generate structured name-value pairs to represent the attributes in a machine-readable format. This enables descriptive prompts with complete object details.

In some embodiments, the object labels are incorporated into a prompt provided to the AI system for reply generation. By analyzing the visual content and extracting object details, the system can construct very specific prompts. The AI-generated replies are tailored to the objects, their relationships, and the context. For example, an appropriate prompt template may be selected based on the media type, detected objects, and use case. Different templates are designated for various contexts. Slots are reserved in the templates to inject details such as object, user, and media details. Accordingly, the extracted attributes are programmatically inserted into the template slots to generate a complete prompt with customized details. Media metadata is incorporated to provide additional context. The final prompt describes the specific objects, relationships, and context to steer the AI response.

In some embodiments, the user can select specific objects depicted within the media item. The selected object is emphasized in the prompt for focused replies.

The detailed prompt may be sent to a large language model optimized for conversational response generation. The AI analyzes the object attributes and context cues within the prompt to craft relevant suggestions. The model outputs numerous reply options based on its training. The replies are filtered for quality and feedback is used to further improve the model. The best responses are returned and displayed to the user.

Consider the following illustrative example from a user perspective. A user is browsing their social media feed and sees a friend has shared media content that includes an image of themselves smiling and posing with a new hairstyle. The user wants to comment something nice about their friend's new look, but can't think of anything clever to write.

The user taps a "Magic Reply" button below the post. The system analyzes the image, detects the friend's face and hair, and sees the user's previous messaging and interaction history this friend. The system presents a text box containing a suggested comment: "Love the new hairstyle! That smile says it all." The user may thereby review the suggestion and provide an input to either select the suggestion or view another before ultimately making a selection.

Networked Computing Environment

FIG. 1 is a block diagram showing an example system 100 for exchanging data (e.g., video data, messages, and associated content) over a network. The system 100 includes multiple instances of a client device 106, each of which hosts a number of applications, including a messaging client 108. Each messaging client 108 is communicatively coupled to other instances of the messaging client 108 and a server system 104 via a network 102 (e.g., the internet).

A messaging client 108 is able to communicate and exchange data with another messaging client 108 and with the server system 104 via the network 102. The data exchanged between messaging client 108, and between a messaging client 108 and the server system 104, includes functions (e.g., commands to invoke functions) as well as payload data (e.g., text, audio, video or other multimedia data).

The server system 104 provides server-side functionality via the network 102 to a particular messaging client 108. While certain functions of the system 100 are described herein as being performed by either a messaging client 108 or by the server system 104, the location of certain functionality either within the messaging client 108 or the server system 104 may be a design choice. For example, it may be technically preferable to initially deploy certain technology and functionality within the server system 104 but to later migrate this technology and functionality to the messaging client 108 where a client device 106 has sufficient processing capacity.

The server system 104 supports various services and operations that are provided to the messaging client 108. Such operations include transmitting data to, receiving data from, and processing data generated by the messaging client 108. This data may include message content, client device information, geolocation information, media augmentation and overlays, message content persistence conditions, social network information, and live event information, as examples. Data exchanges within the system 100 are invoked and controlled through functions available via user interfaces (UIs) of the messaging client 108.

Turning now specifically to the server system 104, an Application Program Interface (API) server 112 is coupled to, and provides a programmatic interface to, application servers 110. The application servers 110 are communicatively coupled to a database server 116, which facilitates access to a database 122 that stores data associated with messages processed by the application servers 110. Similarly, a web server 124 is coupled to the application servers 110, and provides web-based interfaces to the application servers 110. To this end, the web server 124 processes incoming network requests over the Hypertext Transfer Protocol (HTTP) and several other related protocols. In certain embodiments, the database 122 may include a decentralized database.

The Application Program Interface (API) server 112 receives and transmits message data (e.g., commands and message payloads) between the client device 106 and the application servers 110. Specifically, the Application Program Interface (API) server 112 provides a set of interfaces (e.g., routines and protocols) that can be called or queried by the messaging client 108 in order to invoke functionality of the application servers 110. The Application Program Interface (API) server 112 exposes various functions supported by the application servers 110, including account registration, login functionality, the sending of messages, via the application servers 110, from a particular messaging client 108 to another messaging client 108, the sending of media files (e.g., images or video) from a messaging client 108 to a messaging server 114, and for possible access by another messaging client 108, the settings of a collection of media data (e.g., story), the retrieval of a list of friends of a user of a client device 106, the retrieval of such collections, the retrieval of messages and content, the addition and deletion of entities (e.g., friends) to an entity graph (e.g., a social graph), the location of friends within a social graph, and opening an application event (e.g., relating to the messaging client 108).

The application servers 110 host a number of server applications and subsystems, including for example a messaging server 114, an image processing server 118, and a Social network server 120. The messaging server 114 implements a number of message processing technologies and functions, particularly related to the aggregation and other processing of content (e.g., textual and multimedia content) included in messages received from multiple instances of the messaging client 108. As will be described in further detail, the text and media content from multiple sources may be aggregated into collections of content (e.g., called stories or galleries). These collections are then made available to the messaging client 108. Other processor and memory intensive processing of data may also be performed server-side by the messaging server 114, in view of the hardware requirements for such processing.

The application servers 110 also include an image processing server 118 that is dedicated to performing various image processing operations, typically with respect to images or video within the payload of a message sent from or received at the messaging server 114.

The Social network server 120 supports various social networking functions and services and makes these functions and services available to the messaging server 114. Examples of functions and services supported by the Social network server 120 include the identification of other users of the system 100 with which a particular user has relationships or is "following," and also the identification of other entities and interests of a particular user.

System Architecture

Figure 2:
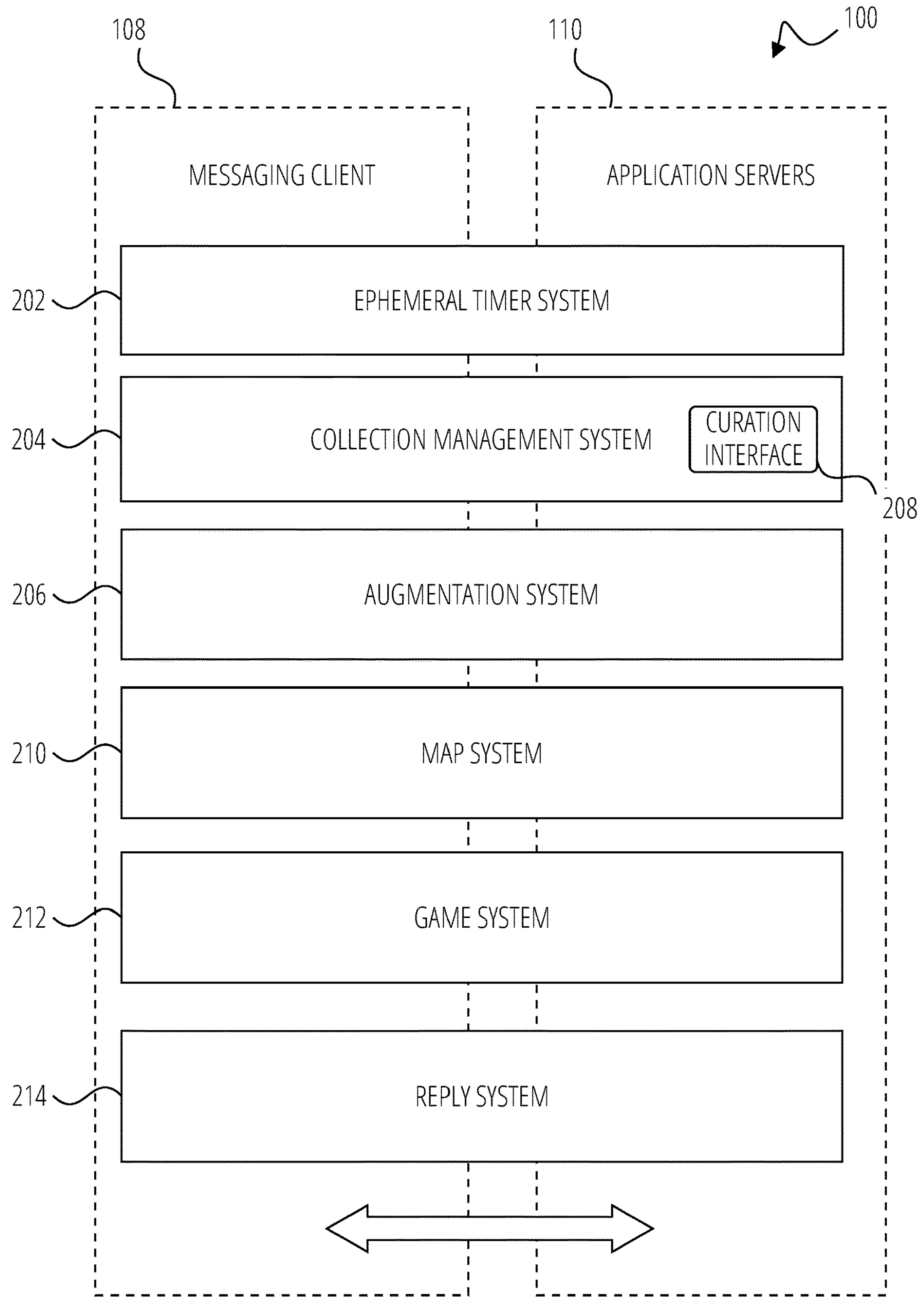
FIG. 2 is a diagrammatic representation of a messaging system, in accordance with some examples, that has both client-side and server-side functionality.

FIG. 2 is a block diagram illustrating further details regarding the system 100, according to some examples. Specifically, the system 100 is shown to comprise the messaging client 108 and the application servers 110. The system 100 embodies a number of subsystems, which are supported on the client-side by the messaging client 108 and on the sever-side by the application servers 110. These subsystems include, for example, an ephemeral timer system 202, a collection management system 204, an augmentation system 206, a map system 210, a game system 212, and a reply system 214.

The ephemeral timer system 202 is responsible for enforcing the temporary or time-limited access to content by the messaging client 108 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 108. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 108.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the system 100. The augmentation system 206 operatively supplies a media overlay or augmentation (e.g., an image filter) to the messaging client 108 based on a geolocation of the client device 106. In another example, the augmentation system 206 operatively supplies a media overlay to the messaging client 108 based on other information, such as social network information of the user of the client device 106. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 106. For example, the media overlay may include text or image that can be overlaid on top of a photograph taken by the client device 106. In another example, the media overlay includes an identification of a location overlay (e.g., Venice beach), a name of a live event, or a name of a merchant overlay (e.g., Beach Coffee House). In another example, the augmentation system 206 uses the geolocation of the client device 106 to identify a media overlay that includes the name of a merchant at the geolocation of the client device 106. The media overlay may include other indicia associated with the merchant. The media overlays may be stored in the database 122 and accessed through the database server 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 210 provides various geographic location functions, and supports the presentation of map-based media content and messages by the messaging client 108. For example, the map system 210 enables the display of user icons or avatars on a map to indicate a current or past location of "friends" of a user, as well as media content (e.g., collections of messages including photographs and videos) generated by such friends, within the context of a map. For example, a message posted by a user to the system 100 from a specific geographic location may be displayed within the context of a map at that particular location to "friends" of a specific user on a map interface of the messaging client 108. A user can furthermore share his or her location and status information (e.g., using an appropriate status avatar) with other users of the system 100 via the messaging client 108, with this location and status information being similarly displayed within the context of a map interface of the messaging client 108 to selected users.

The game system 212 provides various gaming functions within the context of the messaging client 108. The messaging client 108 provides a game interface providing a list of available games that can be launched by a user within the context of the messaging client 108, and played with other users of the system 100. The system 100 further enables a particular user to invite other users to participate in the play of a specific game, by issuing invitations to such other users from the messaging client 108. The messaging client 108 also supports both the voice and text messaging (e.g., chats) within the context of gameplay, provides a leaderboard for the games, and also supports the provision of in-game rewards (e.g., coins and items).

The reply system 214 provides AI-generated replies to media content. When new media is posted by a user, the reply system leverages computer vision techniques to analyze the pixel, frame, and metadata content, identifying depicted objects, text, people, scenes, and other visual attributes. This extracted information is used to construct detailed prompts describing the media context. Concurrently, the reply system maintains user profile data in a database (i.e., the database 122), tracking posting history, interests, and past interactions to profile personalities and preferences.

With the media and user insight, the reply system selects appropriate prompt templates and populates them with the extracted details to prepare structured prompts tailored to the context. These prompts are sent to large language models optimized for conversational text generation. The AI systems analyze the prompts and return numerous suggested replies relevant to the media. The reply system applies quality checks and filtering to select and display the best responses to a user of the client device 106.

Figure 3:
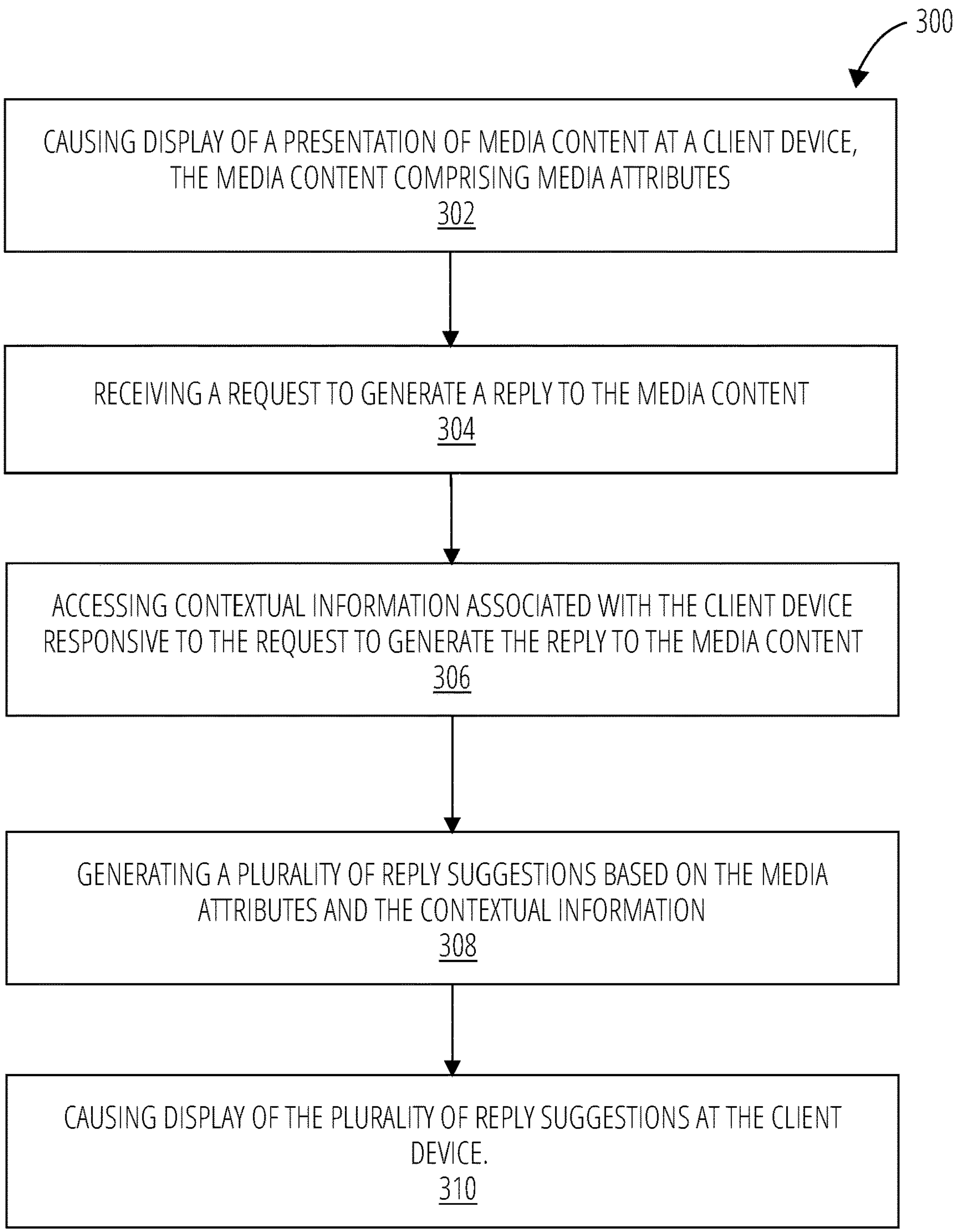
FIG. 3 is a flowchart depicting a method for generating reply suggestions based on media content, in accordance with one embodiment.

FIG. 3 is a flowchart illustrating operations of a reply system 214 in performing a method 300 for providing reply suggestions to media content, in accordance with one embodiment. Operations of the method 300 may be performed by one or more subsystems of the system 100 described above with respect to FIG. 2, such as the reply system 214. As shown in FIG. 3, the method 300 includes one or more operations 302, 304, 306, 308, and 310.

At operation 302, the reply system 214 causes display of media content on a client device 106. The media content comprises images, video, audio, or other media types. The content contains embedded visual, textual, and metadata attributes identifiable by computer vision techniques known in the art.

At operation 304, the client device 106 receives a user request through a graphical icon or other input means to generate reply suggestions. This request is passed to the reply system 214 for processing.

At operation 306, responsive to the request, the reply system 214 accesses contextual information related to the client device 106 and associated user. Contextual data includes location, profiles, interests, posting history, and other environmental or personal context.

At operation 308, the reply system 214 leverages computer vision algorithms to analyze the media attributes and identify depicted objects, scenes, and embedded text. Structured name-value pairs describe object labels, locations, sizes, relationships and other characteristics. The reply system 214 generates a prompt incorporating the extracted object attributes and contextual data. The prompt is provided to a text generation AI model which outputs a plurality of contextual reply suggestions based on the media analysis.

At operation 310, the reply system 214 causes display of the replies on the requesting client device 106, presented within the text input field or as selectable options. The user may cycle through suggestions and select a reply to send. The final selection is logged to improve the AI model. The system can collect explicit feedback on the quality of suggestions.

Figure 4:
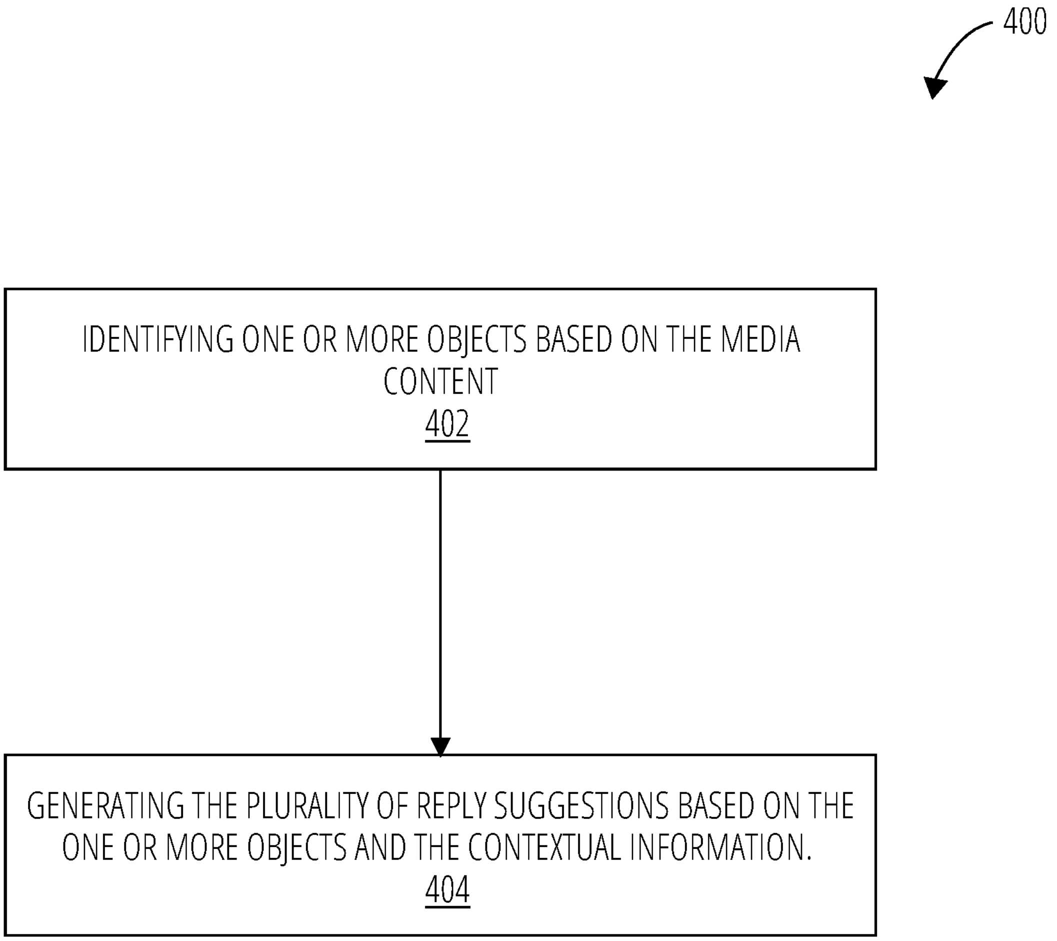
FIG. 4 is a flowchart depicting a method for generating reply suggestions based on media content, in accordance with one embodiment.

FIG. 4 is a flowchart illustrating operations of a reply system 214 in performing a method 400 for providing reply suggestions to media content, in accordance with one embodiment. Operations of the method 400 may be performed by one or more subsystems of the system 100 described above with respect to FIG. 2, such as the reply system 214. As shown in FIG. 4, the method 400 includes one or more operations 402 and 404.

At operation 402, the reply system 214 identifies one or more objects depicted in the media content through analysis of visual, textual, and metadata attributes. Object identification relies on computer vision techniques including convolutional neural networks, feature extraction, shape detection, motion tracking, depth analysis, and semantic segmentation. These techniques recognize patterns to identify people, faces, text, logos, objects, scenes, and other visual features. Custom object detectors can be developed to identify domain-specific objects. Structured name-value pairs describe the detected objects.

At operation 404, the identified object attributes are used by the reply system 214 to construct a detailed prompt reflecting the media context. A predefined prompt template is selected based on the object types, media format, and use case. Slots in the template are populated with the object, user, and media details. The prompt is provided to a large language model optimized for conversational response generation. The AI model analyzes the objects and context described in the prompt and generates a plurality of relevant reply suggestions. The suggestions are filtered and returned to the reply system 214 for display at the client device 106.

Figure 5:
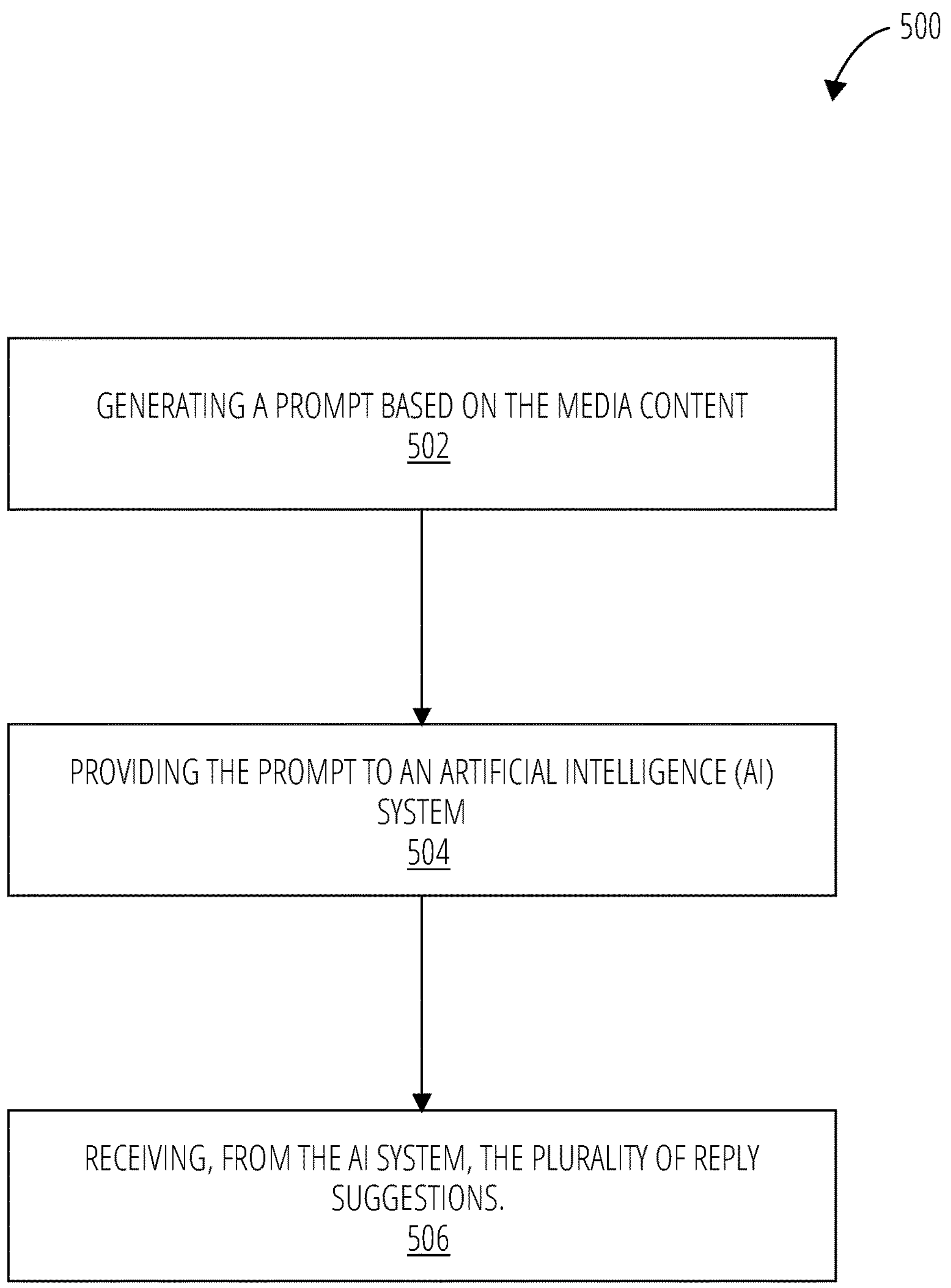
FIG. 5 is a flowchart depicting a method for generating reply suggestions based on media content, in accordance with one embodiment.

FIG. 5 is a flowchart illustrating operations of a reply system 214 in performing a method 500 for providing reply suggestions to media content, in accordance with one embodiment. Operations of the method 500 may be performed by one or more subsystems of the system 100 described above with respect to FIG. 2, such as the reply system 214. As shown in FIG. 5, the method 500 includes one or more operations 502, 504, and 506.

At operation 502, the reply system 214 generates a prompt based on the media content and context. A predefined prompt template is selected from a library based on media attributes and intended use case. Slots in the template are populated with extracted details including identified objects, scenes, text, metadata, location, user profiles, interests, and posting history. This transforms the media context into a detailed natural language prompt.

At operation 504, the constructed prompt is passed from the reply system 214 to a text generation AI system optimized for conversational response. The AI system utilizes large neural network architectures such as GPT-3.5 fine-tuned on dialog data. The prompt provides the context to guide the AI system's generation.

At operation 506, the AI system analyzes the detailed prompt and generates a plurality of reply suggestions relevant to the objects, scenes, text, context, and use case described. The AI system leverages statistical learning to output contextually relevant responses based on the prompt. The suggested replies are returned to the reply system 214 for selection, filtering, and presentation to the user at the client device 106.

Figure 6:
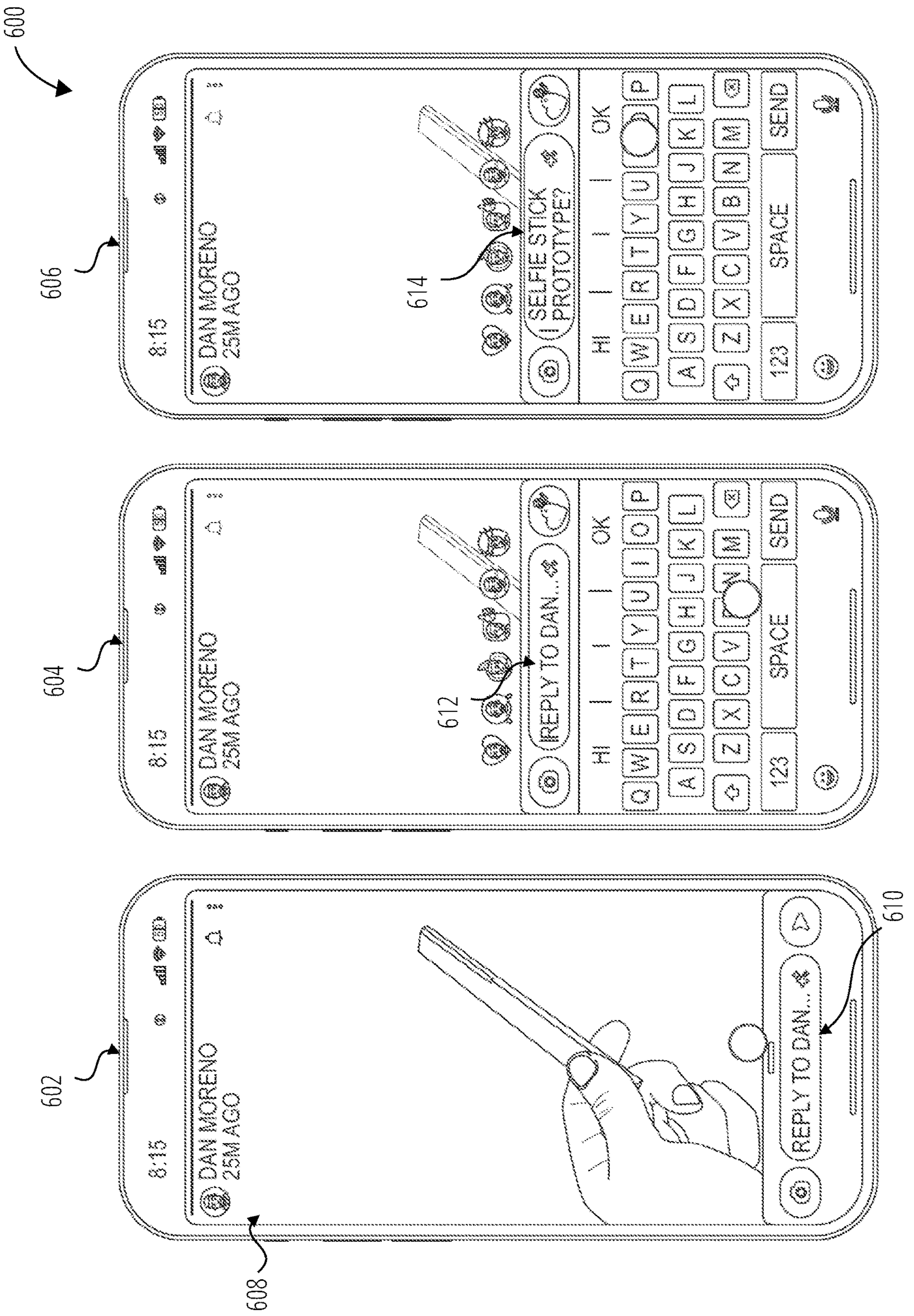
FIG. 6 is an interface flow diagram depicting a method for generating reply suggestions based on media content, in accordance with one embodiment.

FIG. 6 is an interface flow diagram 600 depicting a method for generating one or more reply suggestions based on media content, as described in the methods 300, 400, and 500 of FIGS. 3, 4, and 5, in accordance with one embodiment.

The interface 602 may be presented within a client device 106, such as a mobile phone, tablet, or computer. The interface 602 includes a display of media content 608 comprising images, video, audio, or other media formats. The media 608 contains embedded visual, textual, and metadata attributes identifiable by computer vision algorithms known in the art, including but not limited to convolutional neural networks, object detection models, optical character recognition, facial recognition, logo detection, and other pattern recognition techniques.

Menu element 610 provides a user interface control that allows a user to invoke a request to generate AI-powered reply suggestions, as described in operation 304 of method 300. The menu 610 may contain one or more graphical icons that may be selected by a user of the client device 106.

Interface 604 shows the client device 106 displaying a text input field or reply field 612 responsive to an input that selects a graphical icon from within the menu element 610, as in operation 310 of method 300. The field 612 may be displayed overlaid on the media content 608 or adjacent to it. In some embodiments, the field 612 may already be displayed on the interface before the request, such as within a media viewing or composition application.

Interface 606 shows multiple reply suggestions 614 generated by the system displayed within the reply field 612, realizing operation 310 of method 300. The system identifies objects, scenes, text, and other attributes in the media content 608 by applying computer vision techniques at operation 402 of method 400. This analysis extracts structured details about the media context. A prompt template is selected based on the media format, attributes, and intended use case. The template is populated with the extracted details at operation 502 of method 500 to construct a natural language prompt describing the media context. This prompt is provided to a text generation AI system, such as a large language model, at operation 504 of method 500. The AI system analyzes the detailed prompt and generates a plurality of reply suggestions 614 relevant to the objects, scenes, text, context, and use case described in the prompt, realizing operation 506 of method 500. The suggestions 614 are displayed within the reply field 612.

The user can cycle through the suggestions 614 using interface controls such as swiping or tapping to view additional suggestions from among the generated set. Selection of a reply by the user can log feedback to further improve the AI model, as in operations of method 300. Additional explicit feedback on the quality and relevance of suggestions can also be collected through interface elements.

Machine Architecture

Figure 7:
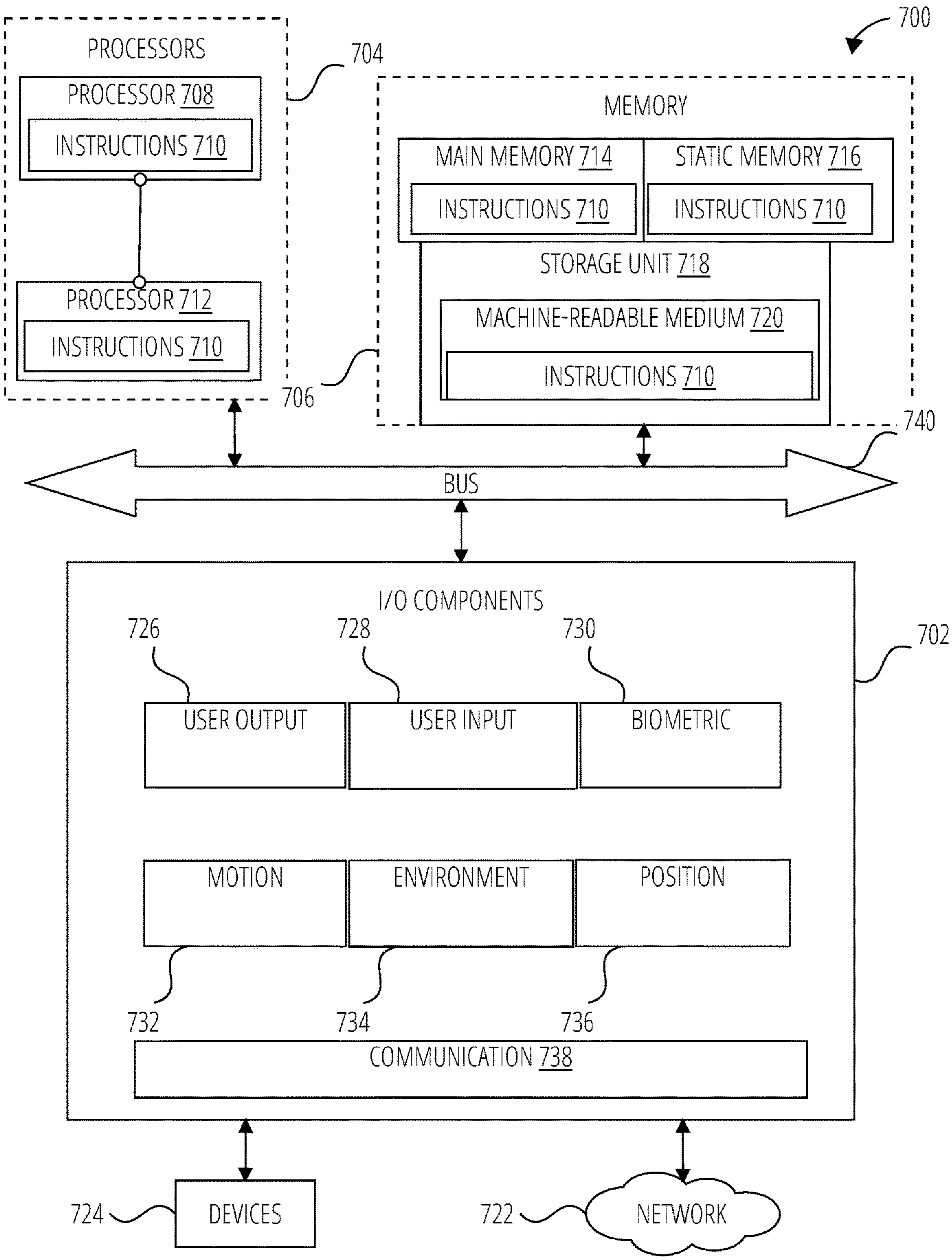
FIG. 7 is a diagrammatic representation of a machine in the form of a computer system within which a set of instructions may be executed for causing the machine to perform any one or more of the methodologies discussed herein, in accordance with some examples.

FIG. 7 is a diagrammatic representation of the machine 700 within which instructions 710 (e.g., software, a program, an application, an applet, an app, or other executable code) for causing the machine 700 to perform any one or more of the methodologies discussed herein may be executed. For example, the instructions 710 may cause the machine 700 to execute any one or more of the methods described herein. The instructions 710 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines that individually or jointly execute the instructions 710 to perform any one or more of the methodologies discussed herein. The machine 700, for example, may comprise the client device 106 or any one of a number of server devices forming part of the server system 104. In some examples, the machine 700 may also comprise both client and server systems, with certain operations of a particular method or algorithm being performed on the server-side and with certain operations of the particular method or algorithm being performed on the client-side.

The machine 700 may include processors 704, memory 706, and input/output I/O components 638, which may be configured to communicate with each other via a bus 740. In an example, the processors 704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 708 and a processor 712 that execute the instructions 710. The term "processor" is intended to include multi-core processors that may comprise two or more independent processors (sometimes referred to as "cores") that may execute instructions contemporaneously. Although FIG. 7 shows multiple processors 704, the machine 700 may include a single processor with a single-core, a single processor with multiple cores (e.g., a multi-core processor), multiple processors with a single core, multiple processors with multiples cores, or any combination thereof.

The memory 706 includes a main memory 714, a static memory 716, and a storage unit 718, both accessible to the processors 704 via the bus 740. The main memory 706, the static memory 716, and storage unit 718 store the instructions 710 embodying any one or more of the methodologies or functions described herein. The instructions 710 may also reside, completely or partially, within the main memory 714, within the static memory 716, within machine-readable medium 720 within the storage unit 718, within at least one of the processors 704 (e.g., within the Processor's cache memory), or any suitable combination thereof, during execution thereof by the machine 700.

The I/O components 702 may include a wide variety of components to receive input, provide output, produce output, transmit information, exchange information, capture measurements, and so on. The specific I/O components 702 that are included in a particular machine will depend on the type of machine. For example, portable machines such as mobile phones may include a touch input device or other such input mechanisms, while a headless server machine will likely not include such a touch input device. It will be appreciated that the I/O components 702 may include many other components that are not shown in FIG. 7. In various examples, the I/O components 702 may include user output components 726 and user input components 728. The user output components 726 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 702 may include biometric components 730, motion components 732, environmental components 734, or position components 736, among a wide array of other components. For example, the biometric components 730 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 732 include acceleration sensor components (e.g., accelerometer), gravitation sensor components, rotation sensor components (e.g., gyroscope).

The environmental components 734 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 106 may have a camera system comprising, for example, front cameras on a front surface of the client device 106 and rear cameras on a rear surface of the client device 106. The front cameras may, for example, be used to capture still images and video of a user of the client device 106 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 106 may also include a 3600 camera for capturing 360° photographs and videos.

Further, the camera system of a client device 106 may include dual rear cameras (e.g., a primary camera as well as a depth-sensing camera), or even triple, quad or penta rear camera configurations on the front and rear sides of the client device 106. These multiple cameras systems may include a wide camera, an ultra-wide camera, a telephoto camera, a macro camera and a depth sensor, for example.

The position components 736 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 702 further include communication components 738 operable to couple the machine 700 to a network 722 or devices 724 via respective coupling or connections. For example, the communication components 738 may include a network interface Component or another suitable device to interface with the network 722. In further examples, the communication components 738 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 724 may be another machine or any of a wide variety of peripheral devices (e.g., a peripheral device coupled via a USB).

Moreover, the communication components 738 may detect identifiers or include components operable to detect identifiers. For example, the communication components 738 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 738, such as location via Internet Protocol (IP) geolocation, location via Wi-Fi® signal triangulation, location via detecting an NFC beacon signal that may indicate a particular location, and so forth.

The various memories (e.g., main memory 714, static memory 716, and memory of the processors 704) and storage unit 718 may store one or more sets of instructions and data structures (e.g., software) embodying or used by any one or more of the methodologies or functions described herein. These instructions (e.g., the instructions 710), when executed by processors 704, cause various operations to implement the disclosed examples.

The instructions 710 may be transmitted or received over the network 722, using a transmission medium, via a network interface device (e.g., a network interface component included in the communication components 738) and using any one of several well-known transfer protocols (e.g., hypertext transfer protocol (HTTP)). Similarly, the instructions 710 may be transmitted or received using a transmission medium via a coupling (e.g., a peer-to-peer coupling) to the devices 724.

Software Architecture

Figure 8:
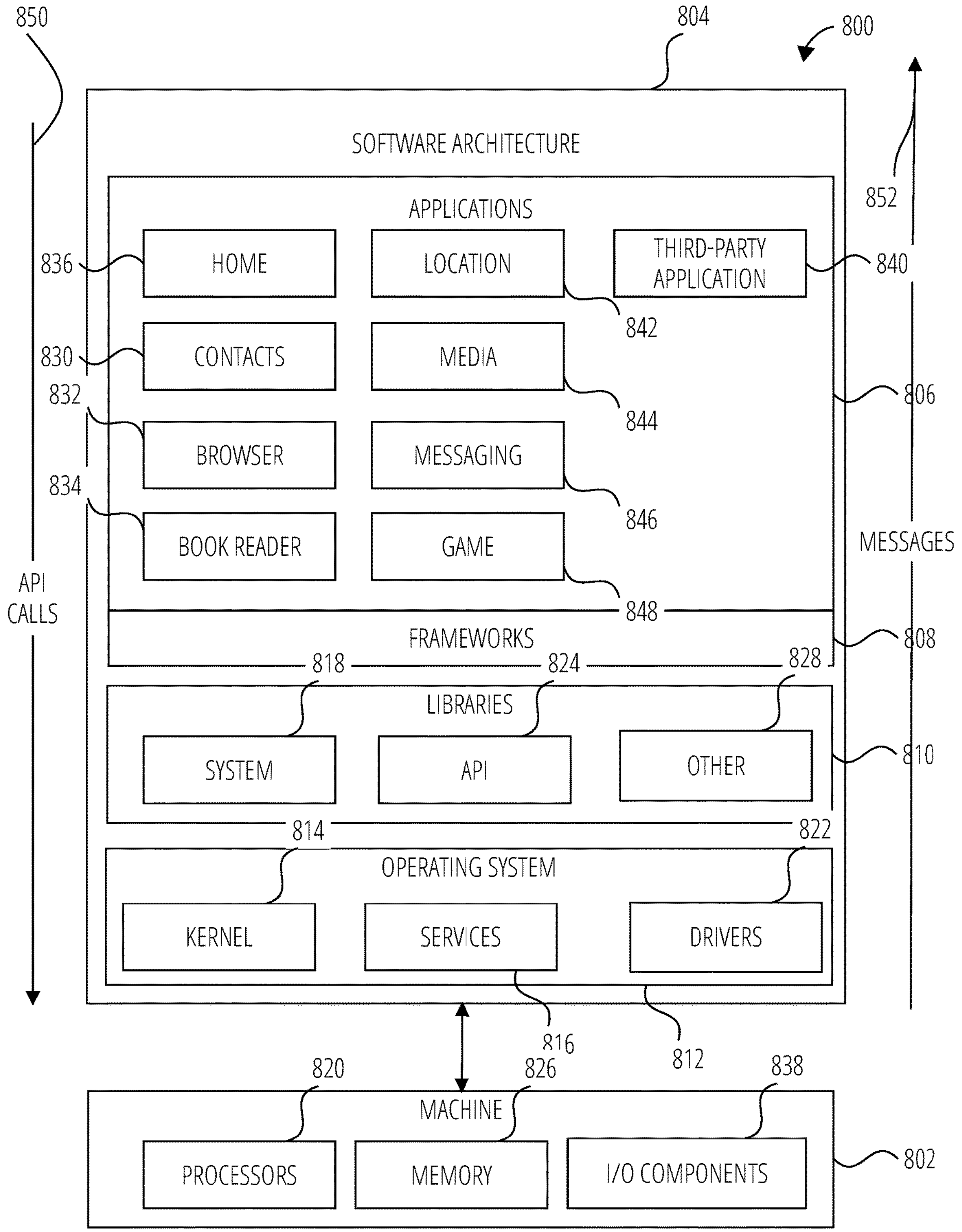
FIG. 8 is a block diagram showing a software architecture within which examples may be implemented.

FIG. 8 is a block diagram 800 illustrating a software architecture 804, which can be installed on any one or more of the devices described herein. The software architecture 804 is supported by hardware such as a machine 802 that includes processors 820, memory 826, and I/O components 838. In this example, the software architecture 804 can be conceptualized as a stack of layers, where each layer provides a particular functionality. The software architecture 804 includes layers such as an operating system 812, libraries 810, frameworks 808, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 822. The kernel 814 acts as an abstraction layer between the hardware and the other software layers. For example, the kernel 814 provides memory management, processor management (e.g., scheduling), component management, networking, and security settings, among other functionality. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 810 provide a common low-level infrastructure used by the applications 806. The libraries 810 can include system libraries 818 (e.g., C standard library) that provide functions such as memory allocation functions, string manipulation functions, mathematic functions, and the like. In addition, the libraries 810 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 810 can also include a wide variety of other libraries 828 to provide many other APIs to the applications 806.

The frameworks 808 provide a common high-level infrastructure that is used by the applications 806. For example, the frameworks 808 provide various graphical user interface (GUI) functions, high-level resource management, and high-level location services. The frameworks 808 can provide a broad spectrum of other APIs that can be used by the applications 806, some of which may be specific to a particular operating system or platform.

In an example, the applications 806 may include a home application 836, a contacts application 830, a browser application 832, a book reader application 834, a location application 842, a media application 844, a messaging application 846, a game application 848, and a broad assortment of other applications such as a third-party application 840. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party application 840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 840 can invoke the API calls 850 provided by the operating system 812 to facilitate functionality described herein.

Processing Components

Figure 9:
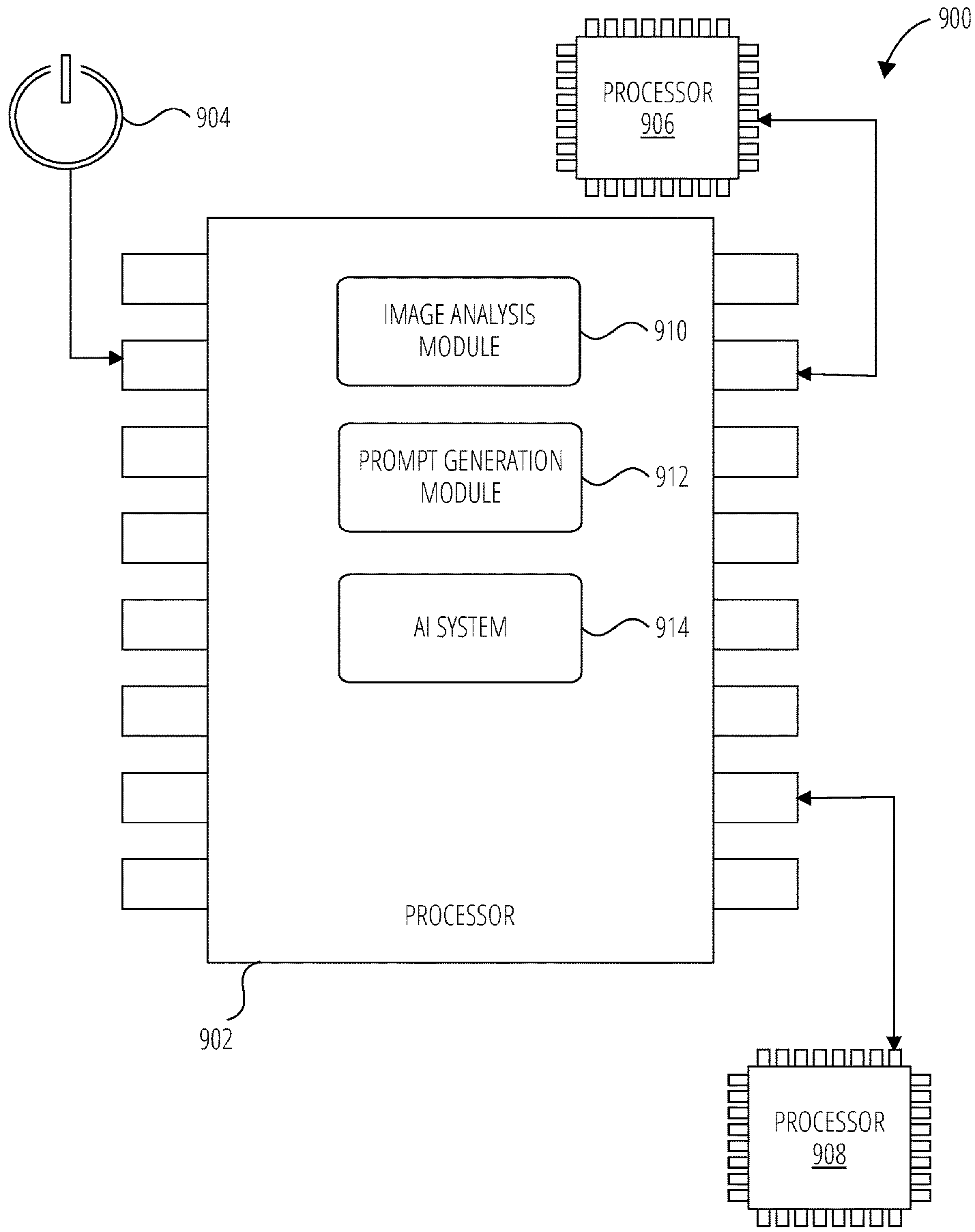
FIG. 9 is a diagrammatic representation of a processing environment, in accordance with some examples.

Turning now to FIG. 9, there is shown a diagrammatic representation of a processing environment 900, which includes a processor 902, a processor 906, and a processor 908 (e.g., a GPU, CPU or combination thereof).

The processor 902 is shown to be coupled to a power source 904, and to include (either permanently configured or temporarily instantiated) modules, namely an image analysis module 910, a prompt generation module 912, and a caption generation module 914, operationally configured to perform operations as discussed in the method 300 of FIG. 3, the method 400 of FIG. 4, the method 500 of FIG. 5, and to generate the interfaces depicted in the interface diagram 600 of FIG. 6, in accordance with embodiments discussed herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:

causing display of a presentation of media content at a client device, the media content comprising media attributes and a depiction of one or more objects;

receiving a request to generate a reply to the media content;

performing object recognition upon the media content to identify the one or more objects depicted in the media content;

accessing contextual information associated with the client device responsive to the request to generate the reply to the media content, the contextual information comprising social media interaction data;

selecting a predefined prompt template from among a plurality of prompt templates based on the one or more identified objects, the contextual information that includes the social media interaction data, and the media attributes;

generating a prompt to be submitted to a Large Language Model (LLM) based on the predefined prompt template, the media attributes, the one or more identified objects, and the contextual information by programmatically inserting the media attributes and the contextual information into reserved slots within the predefined prompt template;

generating a plurality of reply suggestions based on the prompt and the LLM; and causing display of the plurality of reply suggestions at the client device.

2. The method of claim 1, wherein the receiving the request to generate the reply includes:

receiving an input that selects a graphical icon; and generating the request to generate the reply based on the input.

3. The method of claim 1, wherein the media content comprises a depiction of one or more objects, and wherein the generating the plurality of reply suggestions includes:

identifying the one or more objects based on the depiction of the one or more objects and the media attributes; and generating the plurality of reply suggestions based on the one or more objects and the contextual information.

4. The method of claim 3, wherein the identifying the one or more objects includes:

performing object recognition upon the media content; and identifying the one or more objects based on the object recognition.

5. The method of claim 1, wherein the causing display of the plurality of reply suggestions at the client device includes:

causing display of a first reply suggestion within a text input field at the client device;

receiving an input that comprises an input attribute;

responsive to the input, and based on the input attribute, causing display of a second reply suggestion within the text input field.

6. The method of claim 1, wherein the media content comprises image data.

7. The method of claim 1, wherein the contextual information includes one or more of:

location data;

temporal data; and user profile data.

8. A system comprising:

one or more processors; and a memory comprising instructions which, when executed by the one or more processors, cause the one or more processors to perform operations comprising:

causing display of a presentation of media content at a client device, the media content comprising media attributes and a depiction of one or more objects;

receiving a request to generate a reply to the media content;

performing object recognition upon the media content to identify the one or more objects depicted in the media content;

accessing contextual information associated with the client device responsive to the request to generate the reply to the media content, the contextual information comprising social media interaction data;

selecting a predefined prompt template from among a plurality of prompt templates based on the one or more identified objects, the contextual information that includes the social media interaction data, and the media attributes;

generating a prompt to be submitted to a Large Language Model (LLM) based on the predefined prompt template, the media attributes, the one or more identified objects, and the contextual information by programmatically inserting the media attributes and the contextual information into reserved slots within the predefined prompt template;

generating a plurality of reply suggestions based on the prompt and the LLM; and causing display of the plurality of reply suggestions at the client device.

9. The system of claim 8, wherein the receiving the request to generate the reply includes:

receiving an input that selects a graphical icon; and generating the request to generate the reply based on the input.

10. The system of claim 8, wherein the media content comprises a depiction of one or more objects, and wherein the generating the plurality of reply suggestions includes:

identifying the one or more objects based on the depiction of the one or more objects and the media attributes; and generating the plurality of reply suggestions based on the one or more objects and the contextual information.

11. The system of claim 10, wherein the identifying the one or more objects includes:

performing object recognition upon the media content; and identifying the one or more objects based on the object recognition.

12. The system of claim 8, wherein the causing display of the plurality of reply suggestions at the client device includes:

causing display of a first reply suggestion within a text input field at the client device;

receiving an input that comprises an input attribute;

responsive to the input, and based on the input attribute, causing display of a second reply suggestion within the text input field.

13. The system of claim 8, wherein the media content comprises image data.

14. The system of claim 8, wherein the contextual information includes one or more of:

location data;

temporal data; and user profile data.

15. A non-transitory machine-readable storage medium comprising instructions that, when executed by one or more processors of a machine, cause the machine to perform operations comprising:

causing display of a presentation of media content at a client device, the media content comprising media attributes and a depiction of one or more objects;

receiving a request to generate a reply to the media content;

performing object recognition upon the media content to identify the one or more objects depicted in the media content;

accessing contextual information associated with the client device responsive to the request to generate the reply to the media content, the contextual information comprising social media interaction data;

selecting a predefined prompt template from among a plurality of prompt templates based on the one or more identified objects, the contextual information that includes the social media interaction data, and the media attributes;

generating a prompt to be submitted to a Large Language Model (LLM) based on the predefined prompt template, the media attributes, the one or more identified objects, and the contextual information by programmatically inserting the media attributes and the contextual information into reserved slots within the predefined prompt template;

generating a plurality of reply suggestions based on the prompt and the LLM; and causing display of the plurality of reply suggestions at the client device.

16. The non-transitory machine-readable storage medium of claim 15, wherein the receiving the request to generate the reply includes:

receiving an input that selects a graphical icon; and generating the request to generate the reply based on the input.

* * * * *